US009911336B2

(12) United States Patent
Schlechter et al.

(10) Patent No.: US 9,911,336 B2
(45) Date of Patent: Mar. 6, 2018

(54) METHOD FOR IDENTIFICATION OF VEHICLES FOR OPERATING A CAR PARK OR A PARKING AREA

(71) Applicant: SKIDATA AG, Grödig/Salzburg (AT)

(72) Inventors: Thomas Schlechter, Seekirchen am Wallersee (AT); Reinhard Surkau, Traunstein (DE); Sandra Breitenberger, Langenstein (AT); Thomas Buchegger, Dietach (AT); Markus Pichler, Kematen an der Krems (AT)

(73) Assignee: SKIDATA AG, Grödig/Salzburg (AT)

(*) Notice: Subject to any disclaimer, the term of this patent is extended or adjusted under 35 U.S.C. 154(b) by 0 days.

(21) Appl. No.: 15/393,644

(22) Filed: Dec. 29, 2016

(65) Prior Publication Data

US 2017/0193825 A1 Jul. 6, 2017

(30) Foreign Application Priority Data

Dec. 30, 2015 (EP) .................................... 15203061

(51) Int. Cl.
*B60Q 1/48* (2006.01)
*G08G 1/16* (2006.01)
*G08G 1/017* (2006.01)
*G08G 1/04* (2006.01)

(52) U.S. Cl.
CPC ............ *G08G 1/168* (2013.01); *G08G 1/017* (2013.01); *G08G 1/04* (2013.01)

(58) Field of Classification Search
CPC ...................................................... G08G 1/168
USPC ...................................................... 340/932.2
See application file for complete search history.

(56) References Cited

U.S. PATENT DOCUMENTS 3,575,586 A * 4/1971 Kroll ...................... G07B 15/04 235/378
6,476,730 B2 * 11/2002 Kakinami .............. B60Q 9/005 340/435
7,573,381 B2 * 8/2009 Karr .......................... G01S 3/52 340/426.17
9,507,014 B2 * 11/2016 Stelzer
2006/0200307 A1 * 9/2006 Riess ................ G06K 9/00785 701/408
2009/0153362 A1 * 6/2009 Goto ...................... G01C 21/32 340/932.2
2010/0309054 A1 * 12/2010 Pichler ...................... G01S 5/06 342/394
2010/0328105 A1 * 12/2010 Khandani ................ G08G 1/04 340/933

(Continued)

FOREIGN PATENT DOCUMENTS

GB 2513399 A 10/2014

OTHER PUBLICATIONS

European Search Report issued in corresponding European Patent Application No. 15203061.5 dated Jun. 21, 2016.

*Primary Examiner* — Santiago Garcia
(74) *Attorney, Agent, or Firm* — Davis & Bujold PLLC; Michael J. Bujold

(57) ABSTRACT

A method for identification of vehicles (4) for operating a car park or a parking area is proposed in the course of which a vehicle (4) is identified at least by the sound profile emitted by the drive train of the vehicle which comprises a vehicle drive unit in the acoustic wave and/or ultrasonic range in at least one speed range.

14 Claims, 2 Drawing Sheets

(56) References Cited

U.S. PATENT DOCUMENTS

| | | | | |
|---|---|---|---|---|
| 2011/0169664 | A1* | 7/2011 | Berger | G01H 3/08 340/943 |
| 2011/0246210 | A1* | 10/2011 | Matsur | G06Q 10/06 705/1.1 |
| 2012/0265434 | A1* | 10/2012 | Woodard | G08G 1/147 701/423 |
| 2014/0218227 | A1* | 8/2014 | Stelzen | G01S 7/415 342/104 |
| 2014/0270383 | A1* | 9/2014 | Pederson | G08B 13/19647 382/104 |
| 2015/0271601 | A1 | 9/2015 | Boss et al. | |
| 2016/0078760 | A1 | 3/2016 | Crickmore et al. | |
| 2017/0193482 | A1* | 7/2017 | Schlechter | G06Q 20/206 |

* cited by examiner

METHOD FOR IDENTIFICATION OF VEHICLES FOR OPERATING A CAR PARK OR A PARKING AREA

This application claims priority from European patent application serial no. 15203061.5 filed Dec. 30, 2015.

FIELD OF THE INVENTION

The present invention relates to a method for identification of vehicles for operating a car park or a parking.

BACKGROUND OF THE INVENTION

Within the framework of operating a car park or a parking area, it is important to identify incoming and outgoing vehicles in order for example to determine the parking time or to allocate the vehicles a parking place in a certain area of the car park or parking area. Furthermore, in particular in large ear parks or parking areas it is important to perform a localization of the vehicles or a vehicle tracking.

SUMMARY OF THE INVENTION

It is the object of the present invention to provide a method for identification of vehicles for operating a car park or a parking area, as a result of the implementation of which this object can be achieved with little effort cost-effectively.

Accordingly a method for identification of vehicles for operating a car park or a parking area is proposed in the course of which a vehicle is identified at least by means of the sound profile emitted by the drive train comprising a drive unit in the acoustic wave and/or ultrasonic range in at least one speed range.

The method according to the invention is based on the finding that each vehicle can be unambiguously identified by means of the emitted sound profile at a standstill when the drive unit is running or during travel in at least one speed range.

According to the invention, before or during entry of a vehicle into a car park or a parking area, when the vehicle is not moving, which is the case for example, when the vehicle is in front of an access monitoring device of the car park or the parking area, or when a speed which is as constant as possible is maintained within a defined speed range, which is the case for example, during driving in an entrance, the sound profile of the vehicle in the acoustic wave and/or in the ultrasonic range is recorded by means of at least one microphone and is assigned to this vehicle and the respective speed range. By means of the recorded sound profile an acoustic identification signature is created in a server or central computer, which is based on the frequency spectrum of the recorded sound profile and/or its time variation. The speed and therefore the speed range can be determined, for example, by suitable sensors which are provided at the entrance. The speed ranges can be defined as follows, for example: 0, 1-10, 11-20, 21-30, 31-40 km/h. Alternatively the speed ranges can be graded more finely.

Here it is assumed that a defined gear is engaged per defined speed range; for example for a speed between 0 and 10 km/h, it is assumed that first gear is engaged.

In acoustic identification signature can be calculated, for example, from the recorded sound profile or measurement signal by the following steps:

1. Dividing the measurement signals into N consecutive sub-blocks;
2. for all N sub-blocks of the signal;
   a. Subtraction of the average (zero-mean adjustment);
   b. Fast Fourier transformation (FFT) of the signal;
   c. Normalization by dividing by the sum of the absolute magnitudes of the spectral values;
3. Calculation of the mean spectrum of all N spectra of the sub-blocks; and
4. Moving average smoothing of the mean spectrum in the frequency range.

Acoustic identification signatures in the same speed range can be checked for similarity, for example by summing the pointwise differences in the frequency spectrum in order to obtain a similarity dimension for two signatures, if this characteristic is smaller than a predefined threshold value, it is assumed that this is the signature of the same vehicle.

Alternatively the creation of an acoustic identification signature from the recorded sound profile or measurement signal can be based on the extraction and subsequent selection of a defined set of signal properties. Properties which come into question for this are, for example, properties from the time range such as, for example, the energy content of the signal within a short defined time window (short-term energy), spectral properties such as, for example the spectral centre of gravity of the signal (spectral centroid) or the current scatter around a frequency range (spectral spread), band energies wherein the spectrum is divided into defined frequency bands within which the available energy of the signal is calculated and the so-called Mel frequency cepstral coefficients (MFCC coefficients) which are known from voice recognition and lead to a compact representation of the frequency spectrum. The calculation of these coefficients is described comprehensively in the literation and is extremely well known to the person skilled in the art.

It is then investigated which of the above-described properties obtained contributes least to the unambiguous delimitation of the reference data of the signal. In addition, it is investigated how well the current set of signal properties makes it possible to distinguish individual recorded signals or sound profiles wherein in a next step the least relevant property is removed from the description. The above steps are then carried out again until finally at one point, instead of an improvement of the result, a deterioration of the result occurs. At this point all superfluous properties have now been eliminated. A further thinning would certainly further reduce the overall complexity but would not optimally utilize the performance of the system.

By this means a set of signal properties is created which is optimal for a predefined area of application, in the present case for the identification of vehicles, and need not be derived new again in subsequent steps. Certainly the first-time analysis is very complex but the complexity decreases appreciably in real time operation.

Acoustic identification signatures in the same speed range can be checked for similarity by summing the pointwise differences of the signal properties of the set of signal properties which is optimal for a predefined area of application in order to obtain a deviation measure.

If after recording the sound profile and creating the corresponding acoustic identification signature, a comparison in the database of the central computer of the car park or the parking area reveals a defined satisfactory agreement with an already created identification signature in the same speed range, a returning vehicle is recognized and the newly created identification signature, when this differs from the identification signature already obtained in the dataset assigned to this vehicle, for the same speed range, is added to the existing dataset in order to increase the accuracy of the vehicle recognition; if this is not the case, a new dataset is created for a vehicle entering for the first time, containing the identification signature for the current speed range, which is stored in the central computer.

Within the framework of a further development of the invention, an identification signature for the same speed range is added to the existing dataset if the current number of identification signatures for this speed range does not exceed a predefined threshold value.

The dataset assigned to a vehicle can accordingly comprise a plurality of identification signatures of the vehicle in the acoustic wave and/or in the ultrasonic range for different speed ranges. In order to increase the identification accuracy, acoustic identification signatures can additionally be stored as a function of the engaged gear.

When creating the dataset for a vehicle entering for the first time or subsequently, it can also be specified whether this is a premium customer so that after entry, the vehicle is guided to particularly privileged parking spaces, for example, as a result of the proximity to wheelchairs or shops. Furthermore, when creating the dataset it can be specified whether the vehicle is a large or wide vehicle so that after driving-in, the vehicle can be guided to particularly wide parking spaces by means of suitable devices, for example by means of LED signal arrows.

Within the framework of a further development of the invention, it is provided that when a vehicle enters a car park or a parking area for the first time, a dataset is created which, in addition to the identification signature for the current speed range, contains payment data of the driver and/or an invoice address. This information can also be added subsequently to the dataset. In this way, within the framework of a pay-per-use scenario, an access monitoring and calculation of the parking time can be performed without any interaction with the driver of the vehicle. Furthermore, a number of a mobile telephone of the driver can be input and assigned to the vehicle.

The vehicle is hereby recognized when driving-in by means of the sound profile or the acoustic identification signature or as described, is registered as a vehicle entering for the first time, wherein when driving out, the vehicle is recognized by means of the sound profile or the acoustic identification signature and the actual parking time is calculated from the difference between the drive-in time and the drive-out time. The respective access monitoring device of the car park or the parking area is actuated in the opening direction as soon as the vehicle is identified.

For the case that no payment data of the driver or no invoice addresses are stored, during driving out the vehicle is again recognized by means of the sound profile or the acoustic identification signature wherein the parking time is calculated from the difference between the drive-in time and the drive-out time; the driver can pay with conventional means such as, for example with his credit card for example directly at the exit barrier without needing to release a parking ticket at an automatic machine or at a cash desk as is usual. Further possibilities exist by linking the exit barrier to mobile devices, preferably to mobile telephones, possibly for the purpose of reading out payment information which is stored in a mobile telephone. Here in particular interfaces of the mobile devices can be used to increase the conveniences such as, for example a barcode display on the display, NFC functions or Bluetooth or other suitable functions.

According to a further development of the invention, a vehicle tracking of the incoming vehicles can be performed by means of the sound profile emitted by a vehicle, so that a continuous location and localization is possible.

The tracking preferably begins at the time of the vehicle identification or the new recording of a vehicle, i.e. the creation of a dataset for a vehicle entering for the first time since the vehicles are identified at this time and are located at a known location. According to the invention, a plurality of microphones or microphone arrays are arranged in the car park or in the parking area wherein for the case of microphone arrays these can also obtain angular information, i.e. information on the direction of a noise source relative to the microphone array by using adaptive beam forming. Furthermore in order to determine the angular information a so-called time difference of arrival (TDOA) method can be carried out, in the course of which the cross correlation function between the signal received by the respective microphones can be evaluated and thus the location or the direction of the sound source is determined.

The microphones or microphone arrays are arranged in such a manner that the entire car park or the entire parking area is covered. Preferably the microphones are executed as omnidirectional microphones.

The sound profiles emitted by the vehicles, recorded by the microphones are optionally transmitted jointly with the angular information in real time, i.e. with very short latency times to a central computer to ensure a vehicle tracking in real time. In the central computer acoustic identification signatures are created by means of the sound profiles and the vehicles are identified by means of a comparison of the acoustic identification signatures with the datasets in a database if there is satisfactory agreement, wherein a vehicle tracking can be carried out by means of the spatial coordinates of the microphone and optionally the angular information.

According to one embodiment of the invention, the amplitude or the sound recorded by the microphones (RSSI, received signal strength indication) is evaluated in the central computer, wherein by means of the amplitude, the distance of at least three of the microphones from the vehicle is calculated and the vehicle is localized by means of a trilateration or multilateration. Furthermore the localization or the tracking can be accomplished by means of the difference of the sound signal transit time in the case of several microphones (TDOA method, time difference of arrival).

Thus, the parking space of a vehicle in the car park or in a parking area can be determined since this is the location of the last localization of the vehicle when the drive unit is running. Within the framework of a further development of the invention, this information can be transmitted via suitable channels to the driver, for example by SMS or e-mail on his mobile telephone when this is assigned to the vehicle.

Optionally speed information can be determined which enables the recorded identification signature of a vehicle to be compared with stored identification signatures in the same speed range. For the case where no identification signatures are stored for the current speed range or if a recorded identification signature differs from the identification signatures already contained in the dataset for this speed range in the case of satisfactory agreement enabling identification, the currently recorded identification signature is added to the existing dataset assigned to this vehicle in order to increase the accuracy of the vehicle recognition.

The speed information can be obtained by calculating the speed by means of localization of a vehicle as described above by means of trilateration or multilateration for two consecutive time points and the time between the two time points.

Furthermore, alternatively or additionally to the described method, speed information can be calculated by means of the time between the time point at which a microphone receives the sound profile emitted by the vehicle with maximum intensity and the time point at which another microphone receives the sound profile emitted by the same vehicle with maximum intensity and the distance between the two microphones.

Furthermore, alternatively or additionally to the described method, speed information can be obtained by means of the acoustic Doppler effect at at least one microphone. In this case, the time point of the maximum intensity with which the microphone receives the sound profile emitted by the vehicle is the time point at which the vehicle is closest to the microphone. The frequency shift occurring according to the Doppler effect is determined by means of the frequency spectrum before and after this time point and then the speed is calculated in the known manner.

Furthermore respectively one speed sensor can be provided in the vicinity of the microphones whose signal is transmitted to the central computer with the recorded sound profile.

Within the framework of a further development of the invention, during tracking of a vehicle, acoustic identification signatures as a function of the engaged gear and the speed range are added to the dataset assigned to the vehicle, or existing identification signatures stored as a function of the speed range are supplemented by the engaged gear. Here it is assumed that at the beginning of tracking the vehicle is stationary, which is the case if the vehicle is in front of an access monitoring device of the car park or the parking area and that the vehicle is travelling in first gear, wherein the identification signature created at the beginning of movement of the vehicle is stored as identification signature in first gear as a function of the speed range. During tracking a short steep drop in the speed of the drive unit which is reflected in the recorded sound profile, followed by a sound profile which differs from the sound profile recorded before the drop in speed and from the sound profile when the vehicle is stationary is interpreted as a gear change into second gear. Up to a renewed gear change, the created identification signatures are stored as a function of the speed range and the second gear or existing identification signatures for the recorded speed ranges are supplemented by the engaged second gear. In the case of a renewed gear change which is identified as described by means of a short steep drop in the speed of the drive unit, the newly engaged gear is determined by means of a comparison with the existing identification signatures for the first and the second gear. If the identification signature does not correspond to either the first or the second gear for an already evaluated speed range, a change into the third gear is identified. In the case of a renewed gear change, the newly engaged gear is determined by means of at comparison with the identification signatures present for the first, second and third gear etc.

In order to determine whether subsequent gear changes comprise a shift into a higher or lower gear, within the framework of a further development of the invention, the recorded speed can also be used. If for example after a gear change, the speed drops, a gear change into a lower gear is identified; if the speed increases after a gear change or this remains constant, a shifting up is identified.

If the dataset assigned to the vehicle contains acoustic identification signatures as a function of the speed range or the engaged gear, and there is a defined satisfactory agreement with an already-created identification signature in the same speed range for the same gear, a newly created identification signature as a function of the speed range and the engaged gear, if this differs from the identification signature assigned to the vehicle already contained in this for the same speed range and the same gear, is added to the existing dataset in order to increase the accuracy of the vehicle recognition. Within the framework of a further development of the invention, an identification signature for the same speed range and the same gear is added to the existing dataset if the current number of identification signatures for this speed range and this gear does not exceed a predefined threshold value.

If acoustic identification signatures are stored as a function of the engaged gear and the speed range, these are used for the purpose of tracking and for identification of the vehicles, for example when driving into a car park. Accordingly the vehicle is identified by means of the sound profile emitted by the drive train comprising a drive unit in the acoustic wave and/or ultrasonic range in at least one speed range as a function of the engaged gear.

Within the framework of a further development of the invention, it can be provided that prediction for the further movement of a vehicle can be made on the basis of the current tracking information. In this way, vehicles can be distinguished from one another not only by means of their acoustic identification signature but also by means of geometrical framework conditions.

The next stopping place can be predicted from the current speed of the vehicle for a short time interval, possibly of the order of magnitude of one second. Another speed measurement and determination of location also takes place in parallel so that for the following time interval a very accurate prediction of location is again possible. Normally no second vehicle can then be located at this future location. If there should be some ambiguity regarding the resolution of the signatures, the position can continue to be extrapolated until the signatures are unambiguously identified and locations and speeds can be determined. These extrapolated location data are then stored as auxiliary tracking data in order to be able to determine services such as parking information or searched routes.

Furthermore, it can be deduced possibly by means of past experience t that an identified vehicle preferably approaches the parking area of a certain shop. It can then be assumed that this also takes place with a certain probability. Alternatively parking spaces with special properties can be provided in the car park (e.g. ladies' parking spaces, over-width, VIP). Here also from the linking of the dataset for the vehicle to the current tracking information, it can be deduced which parking area the driver will probably approach.

According to a further variant of the method according to the invention, it can be determined by means of the acoustic identification signature of a vehicle and by means of the comparison with a database, whether the vehicle is a large or wide vehicle so that after driving-in, the vehicle is guided to particularly wide parking spaces by means of suitable devices, for example by means of LED signal arrows.

The dataset assigned to the vehicle can additionally comprise a plurality of acoustic identification signatures of the vehicle in the acoustic wave and/or in the ultrasonic range and optionally for different speed ranges which are each assigned to a way of driving and thus to a driver so that as a result of the recorded acoustic identification signature which can be assigned to a specific way of driving, a specific driver can be concluded when driving in. In the case of a driver not known to the system, the dataset is accordingly supplemented by the further acoustic identification signature.

Thus, by means of the sound profile emitted by a vehicle, not only a vehicle identification can be made but on the basis of the identification signature which can be assigned to a specific way of driving before an access monitoring device and/or directly after passing the access monitoring device, a driver profile and therefore a specific driver can be concluded during driving in. This assumes that when registering the driver profile by means of the emitted sound profile, an existing or dataset to be newly created is supplemented by a further corresponding identification signature. In this way, for example, it can be determined when a woman is driving the car so that she is guided to ladies parking spaces or whether a person with mobility problems is driving in so that the vehicle is guided to a parking space near the wheelchairs.

According to a further embodiment of the invention, the identification signatures assigned to a vehicle can also depend on external influences such as, for example on weather influences. For example, for the case of a parking area which is exposed to the weather, acoustic identification signatures can be stored for the vehicles which are dependent on the speed range and on the weather conditions (dry weather, snowfall etc.)

According to a further development of the invention, the spatial acoustics of the car park or the parking area can be taken into account to increase the accuracy. For example, echoes and reverberation can be reduced by means of a corresponding processing of the recorded sound profiles whereby the identification rate and determination of position are optimized in the course of the vehicle tracking. For example, the sound profiles recorded by the microphones or microphone arrays can be freed from echo and reverberation components by filtering and/or deconvolution.

Furthermore, echoes can be used for determining the position of a vehicle on the basis of the given spatial geometry. In this case, occurring acoustic reflections detected in known spatial geometry can be included in the tracking method.

BRIEF DESCRIPTION OF THE DRAWINGS

The invention is explained in detail hereinafter with reference to the appended figures. In the figures.

DETAILED DESCRIPTION OF THE PREFERRED EMBODIMENTS

Figure 1:
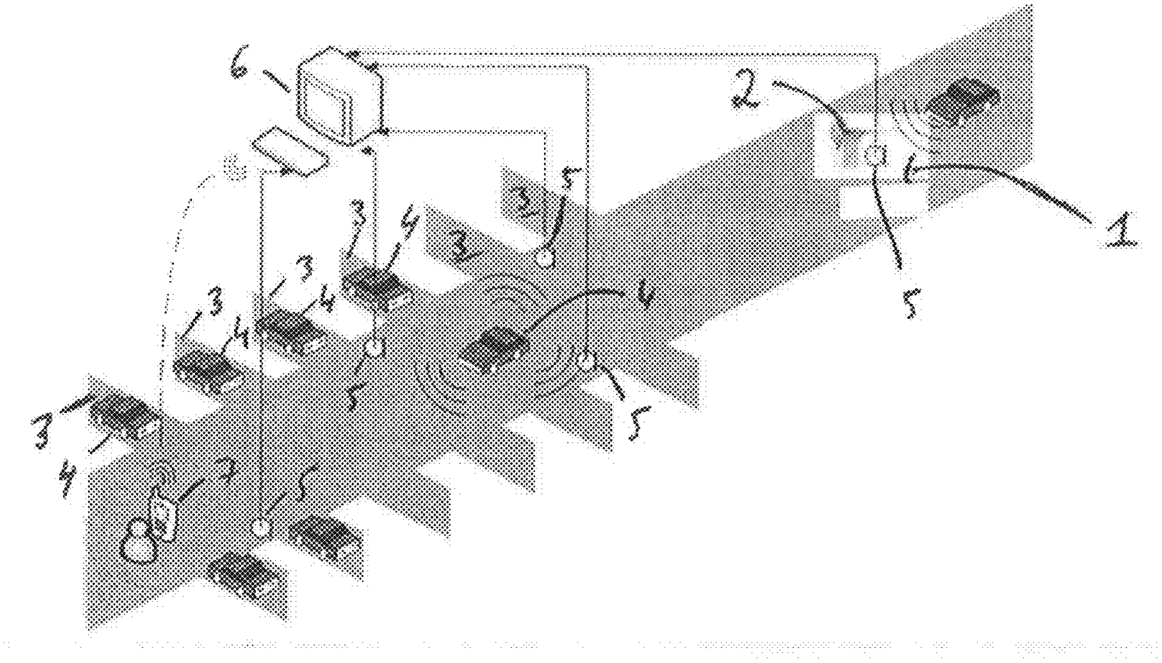
FIG. 1: shows a schematic view of an area of a car park.

In the appended FIG. 1 the entrance into the car park is designated by 1, where an access monitoring device comprising a barrier with the reference number 2 is provided. Individual parking spaces in the car park are provided with the reference number 3, wherein vehicles are designated by the reference number 4. According to the invention, microphones 5 are arranged at the entrance 1 as well as at several locations in the car park, which are connected to a central computer or server 6 for the purpose of data communication in a cableless or cabled manner.

According to the invention, a method for identification of vehicles 4 for operating a car park is proposed in the course of which a vehicle 4 is identified by means of the sound profile emitted by the vehicle drive unit in the acoustic wave and/or ultrasonic range.

With reference to the appended figure, according to the method according to the invention, directly before entry of a vehicle 4 into a car park, i.e., when the vehicle is standing in front of an access monitoring device 2 of the car park, the sound profile of the vehicle 4 in the acoustic wave and/or in the ultrasonic range is recorded by means of at least one microphone 5 and is assigned to this vehicle 4.

By using the recorded sound profile, an acoustic identification signature is created in a central computer, which is based on the frequency spectrum and/or its time variation.

When, after recording the sound profile and creating the corresponding acoustic identification signature, this is classified as the acoustic identification signature of a vehicle, wherein if a comparison in the database of the central computer 6 of the car park reveals a defined satisfactory agreement with an already created identification signature in the same speed range, which in the present case corresponds to the state “idling speed”, a returning vehicle 4 is recognized and the newly created identification signature, when this differs from the identification signature already obtained in the dataset assigned to this vehicle 4, is added to the existing dataset assigned to this vehicle in order to increase the accuracy of the vehicle recognition; if this is not the case, a new dataset is created for a vehicle 4 entering for the first time, comprising the identification signature for the current speed range which is stored in the central computer 6. An acoustic identification signature can, for example be classified as an acoustic identification signature of a vehicle by means of characteristic common properties of the sound profile emitted by vehicles. Here, for example the same methods can be used as for the assignment of an identification signature to an individual vehicle, where however the tolerance threshold value or the extent of deviation for an agreement are increased accordingly. Furthermore, alternatively or additionally to this, it can be determined by means of a suitable sensor whether a vehicle is located in the vicinity of the microphone which has recorded the current sound profile. The sensor can for example be designed as an induction loop, light curtain, radar sensor or camera.

Within the framework of a further development of the invention, it is provided that when a vehicle 4 enters a car park for the first time, a dataset is created which, in addition to the sound profile, contains payment data of the driver and/or an invoice address. In this way, within the framework of a pay-per-use scenario an access monitoring and calculation of the parking time can be performed without any interaction with the driver of the vehicle 4. The vehicle 4 is identified when driving-in by means of the acoustic identification signature, wherein when driving out, the vehicle 4 is again identified by means of the acoustic identification signature and the actual parking time is calculated from the drive-in time and the drive-out time. The respective access monitoring device 2 of the car park is actuated in the opening direction as soon as the vehicle is identified by means of the acoustic identification signature. The payment of the parking fees is made via the stored payment data of the driver, for example, via a credit card.

Advantageously, a vehicle tracking of the vehicles 4 entering a car park can additionally be performed. The tracking preferably begins at the time of the vehicle identification or the new recording of a vehicle, since the vehicles are identified at this time and are located at a known location, in the example shown in front of the access monitoring device 2. According to the invention, a plurality of microphones 5 are arranged in the car park which cover the entire car park.

The sound profile recorded by the microphones are transmitted in real time to a central computer 6 in order to ensure a vehicle tracking in real time. In the central computer 6 the acoustic identification signatures are created by means of the sound profiles and the vehicles are identified by means of a comparison of the acoustic identification signatures with the datasets in a database when there is satisfactory agreement, wherein a vehicle tracking can be carried out by means of the spatial coordinates of the microphones and optionally the angular information. By means of the tracking the parking space of the vehicle 4 can be determined as the location of the last localization of the vehicles 4 when the drive unit is running. In addition, the distribution of the parked vehicles 4 can be used to guide incoming vehicles to free parking spaces.

According to one embodiment of the invention, the amplitude of the sound recorded by the microphones 6 (RSSI, received signal strength indication) is evaluated in the central computer 6, wherein by means of the amplitude the distance of at least three of the microphones 5 from the vehicle 4 is calculated and the vehicle is localized by means of a trilateration. Furthermore, the tracking can be accomplished by means of the different of the sound signal transit time for several microphones 5 (TDOA method, time difference of arrival). Thus, the parking place of a vehicle 4 in the car park or in a parking area can be determined since this is the location of the last localization of the vehicle 4 when the drive unit is running.

According to a further development of the invention, the speed information can be determined in the central computer 6 which enables the recorded identification signature of a vehicle 4 to be compared with stored identification signatures in the same speed range. If no identification signatures are stored in a speed range or if a recorded identification signature of a vehicle 4 differs from the identification signatures already contained in the dataset for this speed range in the case of satisfactory agreement, the currently recorded identification signature is added to the existing dataset assigned to this vehicle in order to increase the accuracy of the vehicle recognition.

The speed information can be obtained by calculating the speed using the localization of a vehicle as described above by means of trilateration or multilateration (if more than 3 microphones are used) for two consecutive time points and the time between the two time points.

In the example shown in the figure, when a vehicle 4 has been localized and the parking place has been determined, the driver of the vehicle 4 is guided to his vehicle by means of his mobile telephone 7 or another mobile device comprising a microphone which is connected to the central computer 6 in a wireless manner for the purpose of data communication, wherein data which enable the mobile telephone 7 or the further mobile device to be identified is contained in the dataset assigned to the vehicle 4. Here the sound signals received from the mobile telephone 7 are also compared in real time with the same signal received by a plurality of microphones 5 arranged in the car park in order to localize the mobile telephone 7 within the car park. When the mobile telephone 7 is localized, information is sent to the mobile telephone 7 from the central computer 6 which guides the driver to his parked vehicle 4.

For localization or the mobile telephone, existing sound signals are detected or in the absence of such, an underground background noise, for example, containing identifiable signal tones of short duration is created and used via loudspeakers. The transit time of these sound signals to the mobile telephone on the one hand and on the other hand to fixedly installed microphones differs according to distance from the sound-emitting loudspeakers or from the noise source. The various transit time differences are evaluated by the TDOA principle whereby it is possible to localize the mobile telephone. In this case the background noise is received by the mobile telephone and analyzed therein, wherein the data obtained are related to a server. Alternatively the sound received by the mobile telephone can be transmitted via suitable interfaces directly from the mobile telephone in a suitably coded manner to a server and evaluated there. In order to avoid ambiguities, possibly left/right symmetries to a line between two fixedly installed microphones, preferably several sound sources at different locations are used and their sound signals are evaluated.

Figure 2:
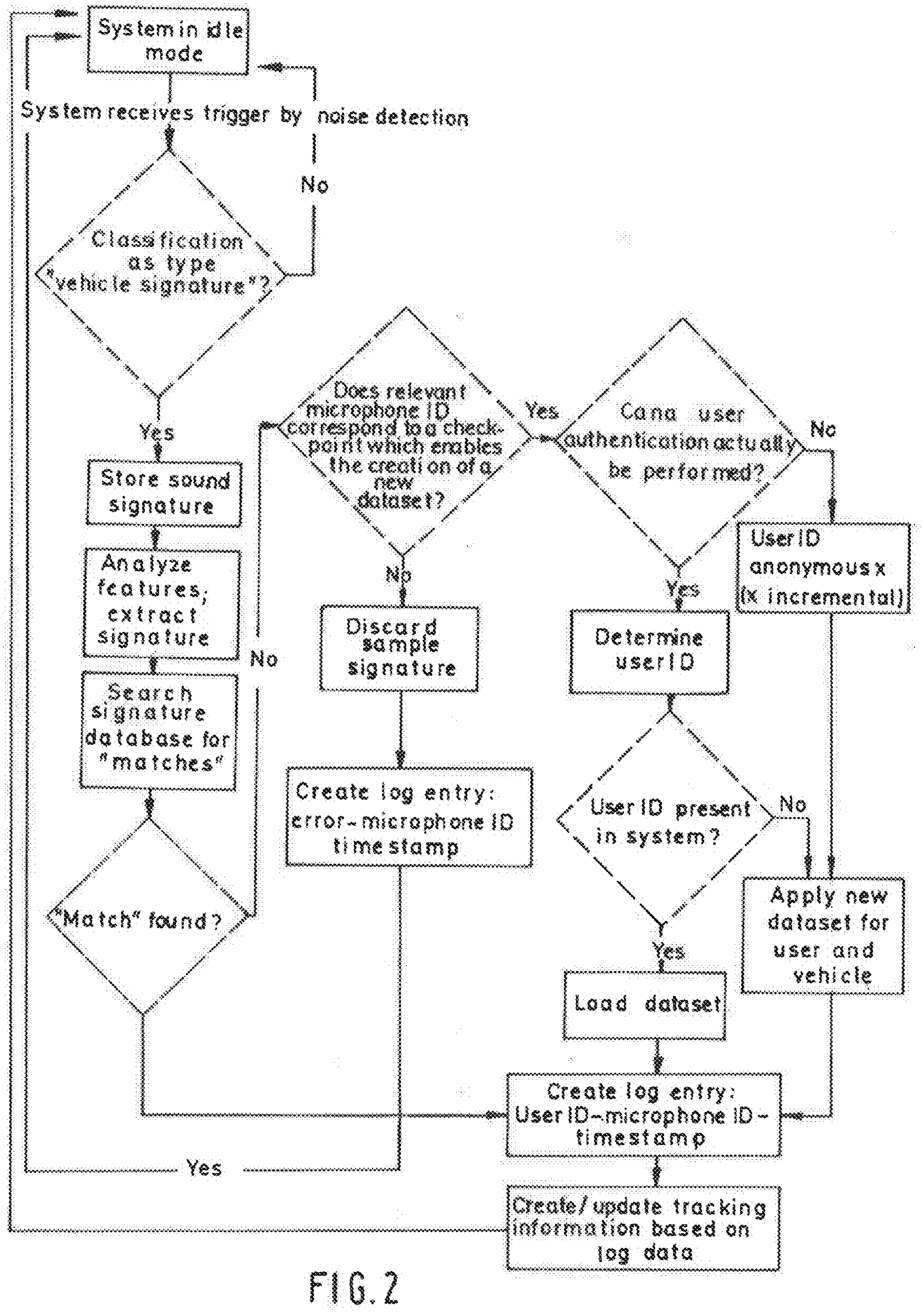
FIG. 2: shows a flow diagram for the exemplary illustration of a possible embodiment of the invention.

FIG. 2 shows a flow diagram for exemplary illustration of a possible embodiment of the method. At the beginning of the method the system is in idle mode wherein the system is activated by noise detection. If after the recording of a sound profile and the creation of the corresponding acoustic identification signature, this is classified as the acoustic identification signature of a vehicle, this is stored and a comparison is made in the database of the central computer. If a defined satisfactory agreement with an already created identification signature is obtained and the corresponding dataset is linked to a user_ID, i.e. contains payment data of the driver, a returning vehicle with known driver is recognized and a corresponding log-entry containing the user_ID, the microphone_ID of the microphone which has recorded the sound profile used for the identification and a time stamp is generated wherein a tracking of the vehicle can then be carried out. If the comparison reveals a defined satisfactory agreement with an identification signature already created or in the case of satisfactory agreement the corresponding dataset is not linked to a user_ID, it is checked whether the microphone by means of which the sound profile used for the identification has been recorded, corresponds to a checkpoint which enables the creation of a new dataset containing a user_ID. If this is not the case, the created acoustic identification signature is discarded and a log entry is generated containing the error (no creation of a new dataset is possible), the microphone_ID of the microphone which has recorded the sound profile used for the identification and a time stamp. If the microphone by means of which the sound profile used for the identification has been recorded, corresponds to a checkpoint which enables the creation of a new dataset containing a user_ID, it is checked whether a user authentication can be made, i.e. whether a user_ID can be created, for example, by means of the input of a credit card. If this is the case, the user_ID is recorded and checked whether this is present in the database linked to another vehicle. If this is the case, the corresponding dataset is used and additionally assigned to the vehicle, whose acoustic identification signature has currently been detected, wherein a corresponding a log entry is generated containing the user_ID, the microphone_ID of the microphone which has recorded the sound profile used for the identification and a time stamp and then a tracking of the vehicle can be carried out. If the user_ID is not present in the database, a new dataset for the vehicle and the user_ID is created wherein a log entry is generated containing the user_ID, the microphone_ID of the microphone which has recorded the sound profile used for the identification and a time stamp and then a tracking of the vehicle can be carried out.

If no user authentication can be carried out, which can also be the case if a driver is unable to do this, a non-personal user_ID anonymous_x (x incremental) and a new dataset for the vehicle and the user_ID is created, wherein a corresponding log entry is generated containing the user_ID, the microphone_ID of the microphone which has recorded the sound profile used for the identification and a time stamp and then a tracking of the vehicle can be carried out. For the case of a non-personal user_ID, the vehicle is identified at the exit by means of the sound profile, wherein the respective access monitoring device of the car park is actuated in the opening direction when a payment, such as with an EC card for example is executed directly at the exit barrier without needing the release a parking ticket at an automatic machine or at a cash desk as usual. The fees are calculated in the system from the difference between the drive-in time and the drive-out time.

The invention claimed is:

1. A method for identification of vehicles (4) for operating a car park or a parking area, the vehicles having a drive train including a vehicle drive unit, the method comprises:

recording, with at least one microphone of an identification system, a sound profile emitted by the drive train of the vehicle in at least one speed range, the sound profile being in an acoustic wave range and/or an ultrasonic range;

evaluating, with a central computer of the identification system, the sound profile emitted by the drive train of the vehicle; and identifying, with the central computer, the vehicle (4) based on the sound profile emitted by the drive train of the vehicle in the acoustic wave range and/or the ultrasonic range in the at least one speed range.

2. A method for identification of vehicles (4) for operating a car park or a parking area, the vehicles having a drive train including a vehicle drive unit, the method comprises:

recording, with at least one microphone of an identification system, a sound profile emitted by the drive train of the vehicle in at least one speed range, the sound profile being in an acoustic wave range and/or an ultrasonic range;

evaluating, with either a server or a central computer of the identification system, the sound profile emitted by the drive train of the vehicle;

identifying, with the central computer, the vehicle (4) based on the sound profile emitted by the drive train of the vehicle in the acoustic wave range and/or the ultrasonic range in the at least one speed range;

before or during entry of a vehicle (4) into the car park or the parking area, when the vehicle is not moving with the drive unit running or when a speed which is as constant as possible is maintained within a speed range, recording the sound profile of the vehicle (4) in the acoustic wave range and/or in the ultrasonic range by the at least one microphone (5) and is assigned to this vehicle and the respective speed range, and by the recorded sound profile, creating an acoustic identification signature in the server or the central computer (6), which is based on a frequency spectrum of the recorded sound profile and/or its time variation, after creating the acoustic identification signature, a comparison in a database of the central computer (6) revealing a defined satisfactory agreement with an already created identification signature in a same speed range, recognizes a returning vehicle (4) and the newly created acoustic identification signature, when this differs from the identification signature already obtained in the dataset assigned to this vehicle, for a same speed range, is added to the existing dataset in order to increase the accuracy of the vehicle recognition wherein if a comparison in the database of the central computer (6) does not reveal any defined satisfactory agreement with an already created identification signature in the same speed range, creating a new dataset for a vehicle (4) entering for the first time, which contains the newly created acoustic identification signature for the current speed range and is stored in the central computer (6).

3. The method for identification of vehicles (4) for operating the car park or the parking area according to claim 2, wherein when a vehicle (4) enters the car park or the parking area for the first time, creating a dataset which, in addition to the newly created acoustic identification signature for the current speed range, contains payment data of the driver and/or an invoice address.

4. The method for identification of vehicles (4) for operating the car park or the parking area according to claim 3, further comprising performing an access monitoring and calculation of the parking time without any interaction with the driver of the vehicle (4), identifying the vehicle (4) when driving in and driving out by the sound profile and the actual parking time is calculated by a difference between the drive-in time and the drive-out time, and actuating a respective access monitoring device (2) of the car park in an opening direction as soon as the vehicle is identified by the sound profile.

5. The method for identification of vehicles (4) for operating the car park or the parking area according to claim 1, further comprising performing, with the identification system, a vehicle tracking of the vehicles (4) driving into the car park or the packing area, after identification of an incoming vehicle (4) or after creating a dataset in the central computer for a vehicle (4) entering for the first time, detecting, with the at least one microphone or a microphone array arranged in the car park, movement of the vehicle (4) in the car park by means of detection and evaluation of the sound profile emitted by the vehicle (4) in the acoustic wave range and/or in the ultrasonic range, and a parking place (3) of the vehicle in the car park is a location of a last localization of the vehicle (4) when the drive unit is running.

6. A method for identification of vehicles (4) for operating a car park or a parking area, the vehicles having a drive train including a vehicle drive unit, the method comprises:

recording, with at least one microphone of an identification system, a sound profile emitted by the drive train of the vehicle in at least one speed range, the sound profile being in an acoustic wave range and/or an ultrasonic range;

evaluating, with a central computer of the identification system, the sound profile emitted by the drive train of the vehicle; and identifying, with the central computer, the vehicle (4) based on the sound profile emitted by the drive train of the vehicle in the acoustic wave range and/or the ultrasonic range in the at least one speed range;

performing, with the identification system, a vehicle tracking of the vehicles (4) driving into the car park or the packing area, after identification of an incoming vehicle (4) or after creating a dataset in the central computer for a vehicle (4) entering for the first time, detecting, with the at least one microphone or a microphone array arranged in the car park, movement of the vehicle (4) in the car park by means of detection and evaluation of the sound profile emitted by the vehicle (4) in the acoustic wave range and/or in the ultrasonic range, and a parking place (3) of the vehicle in the car park is a location of a last localization of the vehicle (4) when the drive unit is running; and transmitting the sound profiles emitted by the vehicles, recorded by the microphones or the microphone arrays and speed information of the vehicles in real time, to the central computer (6), creating acoustic identification signatures in the central computer (6) by the sound profiles and identifying the vehicles by a comparison of the acoustic identification signatures with the datasets in a database for the respective speed range if there is sufficient agreement, performing a vehicle tracking by means of spatial coordinates of the microphones (5) and for the case that microphone arrays are provided, also by angular information wherein if no identification signatures are stored in a speed range or if a recorded acoustic identification signature differs from the identification signatures for this speed range already contained in the dataset in the case of satisfactory agreement, adding the currently recorded acoustic identification signature to the existing dataset assigned to this vehicle in order to increase the accuracy of the vehicle recognition.

7. The method for identification of vehicles (4) for operating the car park or the parking area according to claim 6, wherein the speed information of the vehicles is determined by calculating the speed by the localization of the vehicle by trilateration or multilateration for two consecutive time points and the time between the two time points and/or that the speed is calculated by the time between a time point at which a microphone receives the sound profile emitted by the vehicle with maximum intensity and a time point at which another microphone receives the sound profile emitted by the same vehicle with maximum intensity and the distance between the two microphones and/or that the speed is calculated by means of the acoustic Doppler effect at at least one microphone and/or that respectively one speed sensor is provided in the vicinity of the microphones (5) whose signal is transmitted to the central computer (6).

8. The method for identification of vehicles (4) for operating the car park or the parking area according to claim 6, further comprising carrying out a time difference of arrival (TDOA) method to determine angular information in which a cross correlation function between the signal received by the respective microphone (5) is evaluated.

9. The method for identification of vehicles (4) for operating the car park or the parking area according to claim 6, wherein evaluating an amplitude of the sound recorded by the microphones (5) (RSSI, received signal strength indication) in the central computer (6), and calculating, by the amplitude, the distance of at least three of the microphones (5) from the vehicle (4) and the vehicle is localized by a trilateration or that the localization of the vehicle is accomplished by a difference of the sound signal transit time in the case of several microphones (5).

10. The method for identification of vehicles (4) for operating the car park or the parking area according to claim 5, wherein during tracking of a vehicle (4) acoustic identification signatures as a function of the engaged gear and the speed range are added to the dataset assigned to the vehicle or existing identification signatures stored as a function of the speed range are supplemented by the engaged gear.

11. The method for identification of vehicles (4) for operating the car park or the parking area according to claim 10, wherein it is assumed that at the beginning of tracking the vehicle (4) is stationary which is the case if the vehicle is in front of an access monitoring device of the car park or the parking area and that the vehicle (4) is traveling in first gear, wherein the identification signature created at the beginning of movement of the vehicle is stored as identification signature in first gear as a function of the speed range, wherein during tracking a short steep drop in the speed of the drive unit which is reflected in the recorded sound profile, followed by a sound profile which differs from the sound profile recorded before the drop in speed and from the sound profile when the vehicle is stationary is interpreted as a gear change into second gear, wherein up to a renewed gear change, storing the created identification signatures as a function of the speed range and the second gear or existing identification signatures for the recorded speed ranges are supplemented by the engaged second gear, in the case of a renewed gear change which is identified by a short steep drop in the speed of the drive unit, determining the newly engaged gear by a comparison with the existing identification signatures for the first and the second gear, if the identification signature does not correspond to either the first or the second gear for an already evaluated speed range, identifying a change into a third gear and, in the case of a renewed gear change, the newly engaged gear is determined by a comparison with the identification signatures present for the first, second and third gear.

12. The method for identification of vehicles (4) for operating the car park or the parking area according to claim 10, wherein acoustic identification signatures as a function of the engaged gear and the speed range are used for tracking and for identification of the vehicles.

13. The method for identification of vehicles (4) for operating the car park or the parking area according to claim 5, further comprising when the parking place of a vehicle (4) is localized and determined, guiding a driver of the vehicle (4) to his vehicle by a mobile telephone (7) or another mobile device of the driver comprising a microphone which is connected wirelessly to the central computer (6) for data communication, and containing data which enable the mobile telephone (7) or the further mobile device to be identified in the dataset assigned to the vehicle (4), comparing the sound signals received by the mobile telephone (7) in real time with the same signals received by several microphones (5) arranged in the car park or parking area, recording a transit time of the sound signals to the mobile telephone, on the one hand, and to the microphones, on the other hand, and evaluating the various transit time differences by the time difference of arrival principle, whereby it is possible to localize the mobile telephone and when the mobile telephone (7) has been localized, sending information from the central computer (6) to the mobile telephone (7), which leads the driver to the driver's parked vehicle (4).

14. The method for identification of vehicles (4) for operating the car park or the parking area according to claim 13, wherein for localization of the mobile telephone (7) or the further mobile device, detecting existing sound signals or in the absence of such, providing an underground background noise, containing identifiable signal tones of short duration, via loudspeakers.

* * * * *